United States Patent [19]

Tashiro et al.

[11] 4,026,994

[45] May 31, 1977

[54] METHOD FOR MANUFACTURING GALLIUM PHOSPHIDE

[75] Inventors: Makoto Tashiro; Keijiro Hirahara; Akihiro Yahata, all of Yokohama; Masanobu Ohyama, Zushi, all of Japan

[73] Assignee: Tokyo Shibaura Electric Co., Ltd., Kawasaki, Japan

[22] Filed: Feb. 13, 1976

[21] Appl. No.: 658,018

[30] Foreign Application Priority Data

Feb. 17, 1975 Japan .............................. 50-18738
Apr. 17, 1975 Japan .............................. 50-45841

[52] U.S. Cl. ............................................. 423/299
[51] Int. Cl.² ..................................... C01B 25/00
[58] Field of Search ............ 423/299; 156/DIG. 70

[56] References Cited

UNITED STATES PATENTS

| 3,305,385 | 2/1967 | Pizzarello | 423/299 |
| 3,462,320 | 8/1969 | Lynch et al. | 423/299 |
| 3,617,371 | 11/1971 | Burmeister | 423/299 |

FOREIGN PATENTS OR APPLICATIONS 47-1012  6/1972  Japan .............................. 423/299

*Primary Examiner*—O. R. Vertiz
*Assistant Examiner*—Gregory A. Heller
*Attorney, Agent, or Firm*—Oblon, Fisher, Spivak, McClelland & Maier

[57] ABSTRACT

A method is directed to manufacturing gallium phosphide by reducing gallium orthophosphate in a reducing atmosphere while heating it. In reduction, phosphorus, gallium phosphide and/or phosphine is added as an additive to gallium orthophosphate.

7 Claims, 6 Drawing Figures

METHOD FOR MANUFACTURING GALLIUM PHOSPHIDE

BACKGROUND OF THE INVENTION

This invention relates to a method for manufacturing gallium phosphide by reducing gallium orthophosphate ($GaPO_4$) in a reducing atmosphere while heating it.

A GaP single crystal is widely used as a material for electroluminescence as well as for photocells, light emitting diodes etc. A variety of methods are conventionally known for manufacturing gallium phosphide which is used as a material for the GaP single crystal. A method for reducing gallium orthophosphate in a reducing atmosphere has recently been adopted due to freedom from hazard and since it involves a low manufacturing cost. This method comprises the steps of charging gallium orthophosphate in a reactor and introducing a hydrogen gas as a reducing agent into the reactor to cause gallium orthophosphate to be reduced to gallium phosphide. This process is considered to proceed as follows:

$$2GaPO_4 + 7H_2 \rightarrow Ga_2O + 7H_2O + P_2(\text{or } \tfrac{1}{2}P_4) \quad (1)$$

$$Ga_2O + H_2 + P_2(\text{or } \tfrac{1}{2}P_4) \rightarrow 2GaP + H_2O \quad (2)$$

From these, it will be understood that gallim phosphide is formed by the reaction of phosphorus ($P_2$ or $\tfrac{1}{2}P_4$) with gallium oxide ($Ga_2O$) and that gallium phosphide is not formed through liberation of oxygen direct from gallium orthophosphate. It is also surmised from the fact that gallium phosphide is formed in a needle like crystal.

In the conventional method, however, intermediate product gallium oxide ($Ga_2O$) and phosphor ($P_2$) are blown away during the reducing reaction with a poor yield and the manufacturing efficiency is lowered due to the slow reducing speed. When, for example, sufficient reduction is effected so as to obtain a material for a pn junction luminescence (light emitting diode), an actual yield of GaP is of the order of below 70% of the theory and a lengthy reduction time will be required.

SUMMARY OF THE INVENTION

It is accordingly the object of this invention to provide a method for manufacturing gallium phosphide (GaP) in high yield (about above 80% of the theoretical yield) without requiring any lengthy time by reducing gallium orthophosphide ($GaPO_4$) in a reducing atmosphere.

According to this invention, when gallium orthophosphate is reduced to gallium phosphide, for example, in a hydrogen atmosphere while it is heated, phosphorus (P), gallium phosphide (GaP) and/or phosphine ($PH_3$) is added as an additive to gallium orthosphosphate ($GaPO_4$) so that a high yield of GaP is obtained with a shorter reducing reaction time.

After various experiments conducted it was found that, when a partial pressure of phosphor is present during the reduction reaction in a reactor due to the presence of phosphor or phosphor bearing component, gallium phosphide is liable to be produced. It seems that the tendency of gallium phosphide to be produced because of the presence of an excess amount of phosphor is due to the fact that the rightward reaction proceeds as in equation (2). It is preferred, however, that an amount of phosphorus added be less than 20 weight percent. This is based on the following reasons. That is, for a small amount of phosphorus an excellent result is obtained with an increasing phosphorus, but when the additive exceeds 20 weight percent, no advantageous result is obtained. An excess amount of phosphorus involves hazard. Furthermore, the material per se is consumed without prominent result.

As a reducing atmosphere use may be made of, in addition to hydrogen, any conventional one such as CO, any compound with hydrogen etc. It is preferred that gallium orthophosphate be reduced to gallium phosphide in a reducing atmosphere in the reactor. Even in this case, it is preferred that a turbulent flow be developed within the reactor so as to enhance a positive reduction of $GaPO_4$ and remove water vapor $H_2O$ produced during the reaction.

In order to create such a turbulent flow, for example, a reducing gas can be directed horizontally and vertically down toward gallium orthophosphate ($GaPO_4$). In this case, it is preferred that an amount of reducing gas as well as its flow rate be considered so that the reducing gas can be speeded up in the vertical direction in the neighborhood of gallium orthophosphate ($GaPO_4$). It is prreferred that the vertical flow rate of reducing gas to the horizontal flow be in a range of 1:1 to 4.

The reaction temperature should be in a range of 750° to 1050° C, preferably 800° to 900° C. If the temperature is increased, then the reaction speed is increased by that extent. However, phosphorus is blown away with a poor yield. This temperature range is in a practically allowable range in which more than 80% of GaP of the theoretical yield can be ideally obtained.

DETAILED DESCRIPTION OF THE PREFERRED EMBODIMENTS

A gallium phosphide manufacturing method will be explained together with the associated reaction furnace by referring to FIGS. 1 and 2.

Figure 1:
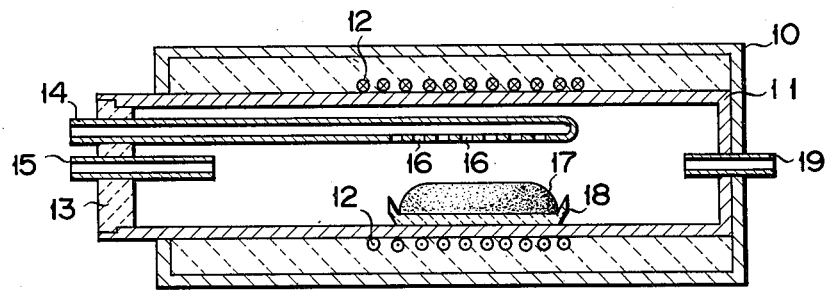
FIG. 1 is a cross-sectional view showing a reactor for explaining a GaP manufacturing method according to this invention.
Figure 2:
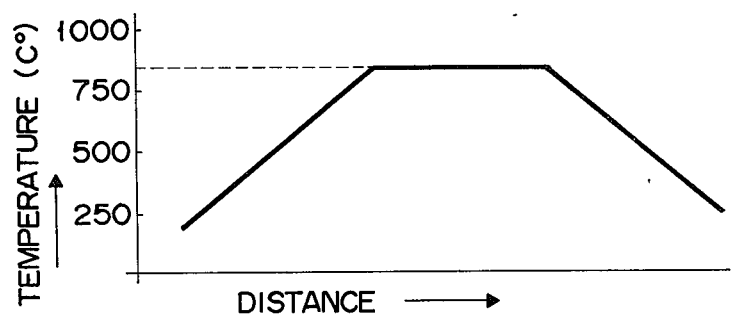
FIG. 2 is a graph showing a heating temperature distribution within the reactor.

A reaction furnace or reactor in FIG. 1 has a housing 10 and a reaction tube 11 mounted within the housing and coaxial with the housing 10. A heater 12 is circumferentially provided on the outer surface of the central portion of the reaction tube 11. A cap 13 made of a heat resistant material is fitted in the open end or forward end of the reaction tube 11. Two reducing atmosphere introducing tubes 14 and 15 hereinafter referred to as first and second tubes are inserted from the outside through the cap into the reactor 11. The first tube 14 extends near the closed end or rear end of the reaction tube and has a plurality of holes 16 formed in the peripheral portion near the end of the first tube 14 so that they are located at the central portion of the reactor. In the central portion of the interior of the reactor 11 is disposed a boat 18 in which a powdered sample 17 is received. As a result, the holes 16 of the tube 14 are placed immediately above the boat 18. The tube 15 terminates in the neighborhood of the forward end of the reactor and far ahead of the boat 18. An exhaust tube 19 is disposed in a position opposite to that in which the tube 15 is provided.

During use, a reducing gas is introduced through the first and second tubes 14 and 15 into the reactor so that it is directed down toward a $GaPO_4$ powder in the boat 18. The $GaPO_4$ powder is reduced primarily by a gas from the first tube 14. The gas is exhausted through the exhaust tube 19 toward the outside. During the reaction, the $GaPO_4$ powder is heated by the heater 12 to a predetermined temperature.

The production of GaP within the reactor 11 will be explained below. 100g of a $GaPO_4$ powder was mixed with 10g of a phosphorus powder and the mixture was received in the boat 18. The boat was placed at the central position of the reactor and a vacuum pump was connected to the tube 14 or 15 with the result that the reaction tube 11 is maintained to about $10^{-5}$ torr. A hydrogen gas was introduced through the tubes 14 and 15 into the reactor at the flow rate of about 100l/hr (a total amount of hydrogen gas from both the first and second tubes 14 and 15). The reaction tube was heated from room temperature to 850° C for about 2 hours to which the mixture in the boat 18 was subjected. The reaction tube was maintained to a temperature of 850° C, while a flow of hydrogen gas from both the first and second tubes 14 and 15 was increased to 500–1000l/hr and maintained at this level. At this time a flow ratio of hydrogen gas from the first and second tubes 14 and 15 was determined to be 2:1. The abovementioned conditions were maintained for 10–12 hours and the $GaPO_4$ in the boat 18 was reduced by the hydrogen gas to produce GaP. After the heat treatment the total flow of hydrogen gas was lowered to 100l/hr and maintained at this level and the reaction tube 11 was cooled at the rate of 100° C/hr to room temperature. Thereafter, the boat is taken out from the reaction tube 11.

During the reduction period it is preferred that in order to prevent scattering of phosphorus a temperature within the reactor be maintained at 850° C at the place where the boat is placed and at a temperature less than 850° C at the other place. In this example, experiments were conducted at a temperature distribution shown in FIG. 2. In FIG. 2 a temperature is plotted as an ordinate and a distance or horizontal location within the reactor is plotted as an abscissa. An amount of $PO_4^{-3}$ radical ions persent in the reduced mixture (GaP is dominant) in the boat 18 was measured by a chemical analysis. The chemical analysis of the $PO_4^{-3}$ radical ion indicates the extent to which the $GaPO_4$ is reduced to GaP. Generally, when the $PO_4^{-3}$ is decreased to 0.5 weight percent, it is understood that the $GaPO_4$ is sufficiently reduced. The above-mentioned experiments were conducted under various conditions so as to attain 0.5% by weight of $PO_4^{-3}$. Table I shows a relation between the reducing time and the amount of GaP (yield).

Table 1

| Sample | Amount of $GaPO_4$ charged (g) | Amount of P added (wt%) | Flow rate of hydrogen (l/hr) | Reducing temperature (° C) | Time required for remaining $PO_4^{-3}$ to be decreased to less than 0.5 weight percent (hr) | Yield of GaP (g) |
|---|---|---|---|---|---|---|
| 1 | 100 | 0 | 900 | 850 | 12 | 43.9 |
| 2 | 100 | 2 | 900 | 850 | 10 | 49.4 |
| 3 | 200 | 0 | 1500 | 850 | 16 | 90.7 |
| 4 | 200 | 2 | 1500 | 850 | 13 | 94.1 |
| 5 | 400 | 0 | 1500 | 850 | 25 | 180.8 |
| 6 | 400 | 5 | 1500 | 850 | 22 | 192.3 |
| 7 | 400 | 10 | 1500 | 850 | 22 | 194.7 |
| 8 | 400 | 20 | 1500 | 850 | 21 | 195.0 |
| 9 | 400 | 30 | 1500 | 850 | 20 | 195.0 |
| 10 | 400 | 35 | 1500 | 850 | 20 | 195.0 |

In Table I, samples 1, 3 and 5 were produced according to a conventional method in which no phosphide is added to the sample. From Table I it will be understood that according to this invention a shorter time is required for the remaining $PO_4^{-3}$ to be decreased to less than 0.5 wt% and an increased yield is obtained as compared with the conventional method. When, for example, 100g of $GaPO_4$ was charged with the addition of 2% by weight of phosphorus, 2 hours are required for the $PO_4^{-3}$ to be decreased to less than 0.5 weight percent. That is, the time required is shortened by more than 15 percent. Furthermore, the yield of GaP is 5.5g, an increase of more than 12%. As far as a small amount of phosphorus is added, an increase of phosphorus shortens the reducing time with an increased yield. As will be understood from the samples 9 and 10 in Table I, however, addition of more than 20 weight percent of phosphorus attains substantially the same effect as in the case of 20% by weight of phosphorus. When, on the other hand, an excess amount of phosphorus is added, the partial pressure of phosphorus is increased. As a result, a decomposition reaction of $GaPO_4$ is retarded with respect to the reaction $$2GaPO_4 + 7H_2 \rightarrow Ga_2O + \tfrac{1}{2}P_4 + 7H_2O$$

and it seems that the promotion of the reducing reaction is also retarded. With the addition of more than 20% by weight of phosphorus, phosphorus deposited on the reaction tube after completion of the reducing reaction burns in the air and a danger is involved. Thus, it is unsuitable from the technical viewpoint.

Figure 3:
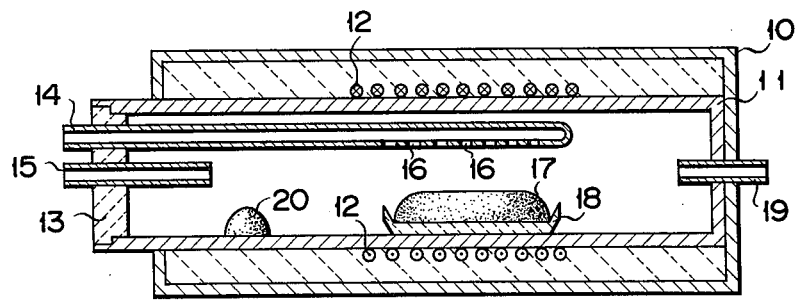
FIG. 3 is a cross-sectional view showing another reactor for explaining another method according to this invention.

Although in the above-mentioned example the mixture of $GaPO_4$ and P is received in the boat, $GaPO_4$ and P may be separately placed in the reaction tube. This example will be explained by referring to FIG. 3. The same reaction tube can be employed in this case and similar reference numberals are employed to designate parts corresponding to those shown in FIG. 1 and any further explanation is therefore omitted. A $GaPO_4$ powder was received in the boat 18 and a solid phosphor 20 was placed on the bottom of the reaction tube 11 on the front side in the reaction tube. A hydrogen gas was introduced into the reaction tube to cause a reducing reaction to occur. A heat treatment was effected in a temperature distribution as shown in FIG. 2 i.e., under the condition that the GaPO$_4$ powder in the boat 18 was heated at 850° C and that the solid phosphor is heated at a temperature for less than 850° C. According to this method the phosphor is maintained in a solid state due to a relatively low temperature.

GaPO$_4$ and a flow rate of 1000l/hr to 2000l/hr, for 400g of GaPO$_4$.

Although in the above-mentioned example phosphor was added to GaPO$_4$, the same result will be obtained even when gallium phosphide (GaP) or phosphine (PH$_3$) is added in place of phosphor. Table II shows the case where gallium phosphide was added, while Table III shows the case where phosphine was added.

Table II

| Sample | Amount of GaPO$_4$ charged (g) | Amount of GaP added (wt%) (weight) | Flow rate of hydrogen (l/hr) | Reducing temperature (° C) | Reducing time (hr) | Yield of GaP (g) | Yields of GaP-amount of GaP added (g) |
|---|---|---|---|---|---|---|---|
| 1 | 100 | 0 | 600 | 850 | 18 | 44.2 | 44.2 |
| 2 | 100 | 2 (2g) | 600 | 850 | 16 | 48.1 | 46.1 |
| 3 | 100 | 5 (5.3g) | 600 | 850 | 16 | 51.8 | 46.5 |
| 4 | 100 | 0 | 900 | 850 | 12 | 43.9 | 43.9 |
| 5 | 100 | 5 (5.3g) | 900 | 850 | 10 | 53.5 | 48.2 |
| 6 | 100 | 10 (11.1g) | 900 | 850 | 9 | 61.4 | 50.3 |
| 7 | 400 | 0 | 1500 | 850 | 25 | 180.8 | 180.8 |
| 8 | 400 | 5 (21.1g) | 1500 | 850 | 23 | 211.8 | 190.7 |
| 9 | 400 | 10 (44.4g) | 1500 | 850 | 20 | 236.3 | 191.9 |
| 10 | 400 | 20 (100.0g) | 1500 | 850 | 20 | 292.0 | 192.0 |

Table III

| Sample | Amount of GaPO$_4$ charged (g) | Amount of PH$_3$ added (wt%) | Flow rate of PH$_3$ (cc/hr) | Flow rate of hydrogen (l/hr) | Reducing temperature (° C) | Reducing time (hr) | Yield of GaP (g) |
|---|---|---|---|---|---|---|---|
| 1 | 100 | 0 | 0 | 900 | 850 | 12 | 43.9 |
| 2 | 100 | 3.4 | 180 | 900 | 850 | 10 | 49.9 |
| 3 | 100 | 4.1 | 240 | 900 | 850 | 9 | 51.0 |
| 4 | 400 | 0 | 0 | 1500 | 850 | 25 | 180.8 |
| 5 | 400 | 3.4 | 300 | 1500 | 850 | 24 | 190.5 |
| 6 | 400 | 6.5 | 600 | 1500 | 850 | 23 | 192.4 |
| 7 | 400 | 12.7 | 1200 | 1500 | 850 | 22.5 | 193.0 |

During the reduction reaction phosphor is evaporated little by little and the reducing speed of the GaPO$_4$ in the boat 18 was expedited.

In the above-mentioned example, 100g and 400g of GaPO$_4$ were respectively charged in the boat 18, but 200g, 300g and more can be charged in the boat. It is to be noted that no restriction is made to an amount of GaPO$_4$ charged. For 100g or 200g of GaPO$_4$, a total flow of hydrogen gas from the tubes 14 and 15 was at the rate of 900l/hr and for 400g of GaPO$_4$, at the rate of 1500l/hr. However, no restriction is made to such an amount of GaPO$_4$. For example, it is preferred that a flow rate of 500l/hr to 1000l/hr be used to 100g of For gallium phosphide, it is desirable that, after GaP is mixed with GaPO$_4$, reduction be effected. For phosphine, it can not be added in powder form to GaPO$_4$ due to a high vapor pressure and in this case a PH$_3$ gas was added, through the tube, to GaPO$_4$ together with a H$_2$ gas when a predetermined temperature (850° C) was reached. From Table III it will be understood that when a flow rate of phosphine reaches 1200cc/hr a GaP powder obtained is substantially the same as in case of a 600cc/hr flow rate.

In the reactor shown in FIG. 1 various experiments were conducted by varying the flow rate of reducing gas from the first and second tubes 14 and 15 as well as the number of holes 16 of the first tube 14. The results are shown in Tables IV, V and VI.

Table IV

| Sample | Amount of GaPO$_4$ charged (g) | Amount of P added (wt%) | Reducing temperature (° C) | Flow of H$_2$ gas (l/hr) | Gas flow from first tube (l/hr) | Number of holes in first tube | Time required for remaining PO$_4^{-3}$ to be lowered to 0.5wt% | Yield of GaP (g) |
|---|---|---|---|---|---|---|---|---|
| 1 | 100 | 0 | 850 | 900 | 600 | 9 | 9 | 50 |
| 2 | 100 | 2 | 850 | 900 | 600 | 9 | 8.5 | 52 |
| 3 | 400 | 0 | 850 | 1500 | 1000 | 15 | 21 | 210 |
| 4 | 400 | 5 | 850 | 1500 | 1000 | 15 | 20 | 216 |
| 5 | 400 | 10 | 850 | 1500 | 1000 | 15 | 20 | 221 |
| 6 | 400 | 20 | 850 | 1500 | 1000 | 15 | 19.5 | 230 |

Table IV-continued

| Sample | Amount of GaPO$_4$ charged (g) | Amount of P added (wt%) | Reducing temperature (° C) | Flow of H$_2$ gas (l/hr) | Gas flow from first tube (l/hr) | Number of holes in first tube | Time required for remaining PO$_4^{-3}$ to be lowered to 0.5wt% | Yield of GaP (g) |
|---|---|---|---|---|---|---|---|---|
| 7 | 400 | 30 | 850 | 1500 | 1000 | 15 | 19 | 230 |
| 8 | 400 | 35 | 850 | 1500 | 1000 | 15 | 19 | 230 |

Table V

| Sample | Amount of GaPO$_4$ charged (g) | Amount of GaP (wt%) | Amount of GaP added (g) | Reducing temperature (° C) | Total flow of H$_2$ (l/hr) | Gas flow from first tube (l/hr) | Number of holes in first tube | Time required for remaining PO$_4^{-3}$ to be lowered to 0.5wt% | Yield of GaP (g) | Yield of GaP-amount of GaP added (g) |
|---|---|---|---|---|---|---|---|---|---|---|
| 1 | 100 | 0 | 0 | 850 | 900 | 600 | 9 | 9 | 50 | 50 |
| 2 | 100 | 5 | 5.3 | 850 | 900 | 600 | 9 | 8.5 | 58.2 | 52.9 |
| 3 | 100 | 10 | 11.1 | 850 | 900 | 600 | 9 | 8.0 | 65.3 | 54.2 |
| 4 | 400 | 0 | 0 | 850 | 1500 | 1000 | 15 | 21 | 210 | 210 |
| 5 | 400 | 5 | 21.1 | 850 | 1500 | 1000 | 15 | 20 | 241.3 | 220.2 |
| 6 | 400 | 10 | 44.4 | 850 | 1500 | 1000 | 15 | 19.5 | 268.9 | 224.5 |
| 7 | 400 | 20 | 100.0 | 850 | 1500 | 1000 | 15 | 19.5 | 326.0 | 226.0 |

Table VI

| Sample | Amount of GaPO$_4$ charged (g) | Amount of PH$_3$ added (wt%) | Flow rate of PH$_3$ (cc/hr) | Total flow of hydrogen (l/hr) | Gas flow of first tube (l/hr) | Number of holes in first tube | Reducing temperature (° C) | Time required for remaining PO$_4^{-3}$ to be lowered to 0.5wt% | Yield of GaP (g) |
|---|---|---|---|---|---|---|---|---|---|
| 1 | 100 | 0 | 0 | 900 | 600 | 9 | 850 | 9 | 50.0 |
| 2 | 100 | 3.4 | 180 | 900 | 600 | 9 | 850 | 8.5 | 53.0 |
| 3 | 100 | 4.1 | 240 | 900 | 600 | 9 | 850 | 8.0 | 54.1 |
| 4 | 400 | 0 | 0 | 1500 | 1000 | 15 | 850 | 21 | 210.0 |
| 5 | 400 | 3.4 | 300 | 1500 | 1000 | 15 | 850 | 20 | 220.1 |
| 6 | 400 | 6.5 | 600 | 1500 | 1000 | 15 | 850 | 19.5 | 225.6 |
| 7 | 400 | 12.7 | 1200 | 1500 | 1000 | 15 | 850 | 19.5 | 229.7 |

Upon comparison between Tables IV, V and VI it will be understood that the results of this invention can be obtained by properly selecting the flow rate of reducing gas from the first and second tubes as well as the number of holes of the first tube. This is primarily due to the hydrogen gas from the first tube. For guidance we will show in Table VII experiment data showing the case where P, GaP or PH$_3$ is not added.

10 to 20% and a yield of GaP is increased to 10 to 15%. As will be also evident from Table VII an increased number of holes in the first tube 14 leads to a shortened reducing time and an increased yield of GaP. When the flow rate of gas per hole in the first tube 14 exceeds 100l/hr, it seems that the reaction product H$_2$O, as well as the intermediate product Ga$_2$O and P$_2$, is blown away with a decreased yield. When the flow rate of gas Table VII

| Sample | Amount of GaPO$_4$ charged (g) | Reducing temperature (° C) | Total flow of H$_2$ gas (l/hr) | Gas flow from first tube (l/hr) | Number of holes in first tube | Flow of gas per hole (l/hr) | Time required For remaining PO$_4^{-3}$ to be lowered to 0.5wt% (hr) | Yield of GaP (g) |
|---|---|---|---|---|---|---|---|---|
| 1 | 100 | 850 | 900 | 0 | — | — | 12 | 43.9 |
| 2 | 100 | 850 | 900 | 600 | 6 | 100 | 10 | 48 |
| 3 | 100 | 850 | 900 | 600 | 9 | 67 | 9 | 50 |
| 4 | 400 | 850 | 1500 | 0 | — | — | 25 | 180.8 |
| 5 | 400 | 850 | 1500 | 1000 | 10 | 100 | 22 | 200 |
| 6 | 400 | 850 | 1500 | 1000 | 15 | 67 | 21 | 210 |

As will be evident from Table VII when the reducing gas is directed hrizontally and vertically down toward the GaPO$_4$ powder through the second and first tubes 15 and 14, respectively, the reducing time is reduced to per hole is lowered to less than 50l/hr, the reaction product water vapor (H$_2$O) remains in the reactor to cause gallium phosphide (GaP) to be decomposed as in the prior art, though it is not clear from Table VII. As a result, the reduction reaction is prohibited. It is therefore preferred that the flow rate of gas per hole be in a range of 50 to 100l/hr. This preferred flow rate of gas is related to the number of the size as well as the size of the hole. Practically, however, when 100g of $GaPO_4$ powder is charged in the reactor 5 to 10 holes are used with the hole size of 1 to 2 mm$\phi$ and when 400g of $GaPO_4$ powder is charged in the reactor 8 to 20 holes are used with the hole size of 1 to 2 mm$\phi$.

Although in the above-mentioned embodiment, all the holes in the first tube constitute a mesh structure, a lattice structure, for example, may be formed at the first tube. Any other structure may be used so far as the $GaPO_4$ powder is stirred by the reducing gas and the reaction product water vapor ($H_2O$) is blown away. It should be noted, however, that at least two gas passages are required to stir the reducing gas.

Table VIII shows the progression of the reduction reaction when the flow ratio of a gas from the first and second tubes is varied.

Table VIII

| Sample | Amount of GaPO charged (g) | Reducing temperature (°C) | Flow rate of $H_2$ gas (l/hr) | Flow of gas from second tube (l/hr) | Flow of gas from first tube (l/hr) | Number of holes in first tube | Reducing time (hr) | A Remaining amount of $PO_4^{-3}$ (wt%) |
|---|---|---|---|---|---|---|---|---|
| 1 | 100 | 850 | 900 | 900 | 0 | 9 | 10 | 2.5 |
| 2 | 100 | 850 | 900 | 300 | 600 | 9 | 10 | 0.4 |
| 3 | 100 | 850 | 900 | 180 | 720 | 9 | 10 | 0.3 |
| 4 | 100 | 850 | 900 | 0 | 900 | 9 | 10 | 1.5 |

It seems that the gas stream from the second tube swiftly removes from the reactor a material such as a reaction product water vapor which inhibits the reduction reaction, and serves to promote the reduction reaction. When no gas stream from the second tube exists as shown in the sample in Table VIII, the reaction product water vapor blown away by the gas stream from the first tube, particularly the one far away from the exhaust tube, is trapped by the gas stream from the mesh-like structure of the first tube and there is less chance that it is smoothly sucked into the exhaust tube. The gas stream from the second tube, therefore, can not be disregarded in an attempt to promote the reduction reaction.

In the respective examples P, GaP or $PH_3$ is used singly, but they may be used in combination as required.

Modified forms of the reactor (FIG. 1) most suitable for the practice of this invention will now be explained below by referring to FIGS. 4 to 6.

Figure 4:
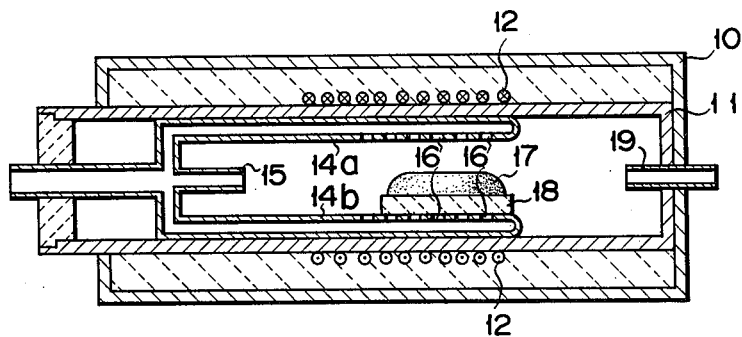
FIGS. 4 to 6 are respectively cross-sectional views of the reactors for explaining various methods according to this invention.

In a reactor shown in FIG. 4 a trifucate reaction tube extends into the reaction tube 11. The uppermost branch tube 14a has a plurality of holes 16 formed in the undersurface thereof as in the case of the tube 14 in FIG. 1. The arrangement permits a reducing gas to be directed down toward a sample 17. The intermediate branch tube 15 is adapted to horizontally introduce the reducing gas in the reaction tube 11 as in the case of the second tube 15. The lowest branch tube 14b is a new one which extends under the boat 18. The branch tube 14b has a plurality of holes 16 directed up toward the boat 18. It is necessary that the boat be made of a heat resistant material so as to permit the reducing gas to flow through the boat 18. In the reactor shown in FIG. 4 the reducing gas conductive to the reducing reaction is directed toward the sample 17, a mixture of a $GaPO_4$ powder and a phosphorus powder, for instance, for both the up and down sides of the boat 18, with the result that a good reaction efficiency is obtained.

Figure 5:
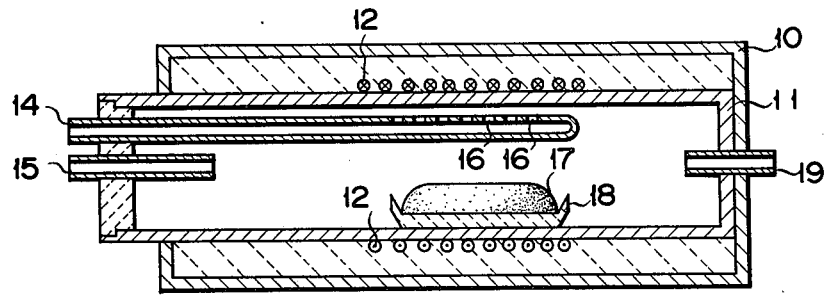

A reactor shown in FIG. 5 is substantially the same as the reactor in FIG. 1 except that a plurality of holes 16 are formed in the upper surface of a first tube 14. In this reactor a reducing gas introduced from the first tube 14 through the holes 16 into the reactor is directed first upwardly to the upper surface of the reaction tube and then down toward a sample 17.

Figure 6:
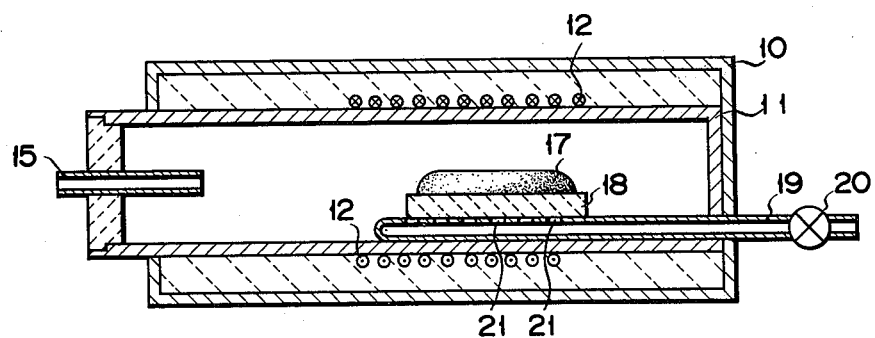

In a reactor shown in FIG. 6 an exhaust tube 19 has a plurality of holes 16 formed in the upper surface thereof and is connected to an exhaust pump 20 so that a reducing gas is directed first horizontally and then down to a sample 17. In this case, the reducing gas can be passed down toward the exhaust pipe as in the case of the reactor in FIG. 4.

What we claim is:

1. A method for manufacturing gallium phosphide comprising:
   a. charging gallium orthophosphate and an additive selected from the group consisting of phosphorous and gallium phosphide into a reactor:
   b. heating said gallium orthophosphate at a temperature of 750°–1100° C; and
   c. introducing a reducing gas into the reaction; wherein said reducing gas is directed both horizontally and vertical down toward said gallium orthophosphate.

2. The method according to claim 1, in which said reduction is effected at 800° to 900° C.

3. The mthod according to claim 1, in which said step of introducing a reducing gas is carried out by first and second tubes extending to the reactor, the first tube having a plurality of holes located above gallium orthophosphate through which the reducing gas vertically flows to the gallium orthophosphate, and the second tube horizontally introducing the reducing gas.

4. The method according to claim 3, in which the flow rate of the reducing gas from the first tube, to the second tube is 1:1 to 4:1.

5. The method according to claim 1, in which said additive is placed in the form of a mixture with gallium orthophosphate in the reactor.

6. The method according to claim 1, in which said additive is phosphorus which is placed at a predetermined interval from the gallium orthophosphate.

7. A method for manufacturing gallium phosphide comprising the steps of inserting gallium orthophosphate in a reactor and reducing gallium orthophosphate at a temperature of 750° C to 1100° C, with a phosphine containing reducing gas directed both horizontally and vertically down toward said gallium orthophosphate.

* * * * *